C. H. DOOLEY.
PLANTER.
APPLICATION FILED MAR. 24, 1910.
1,202,684.
Patented Oct. 24, 1916.
3 SHEETS—SHEET 1.
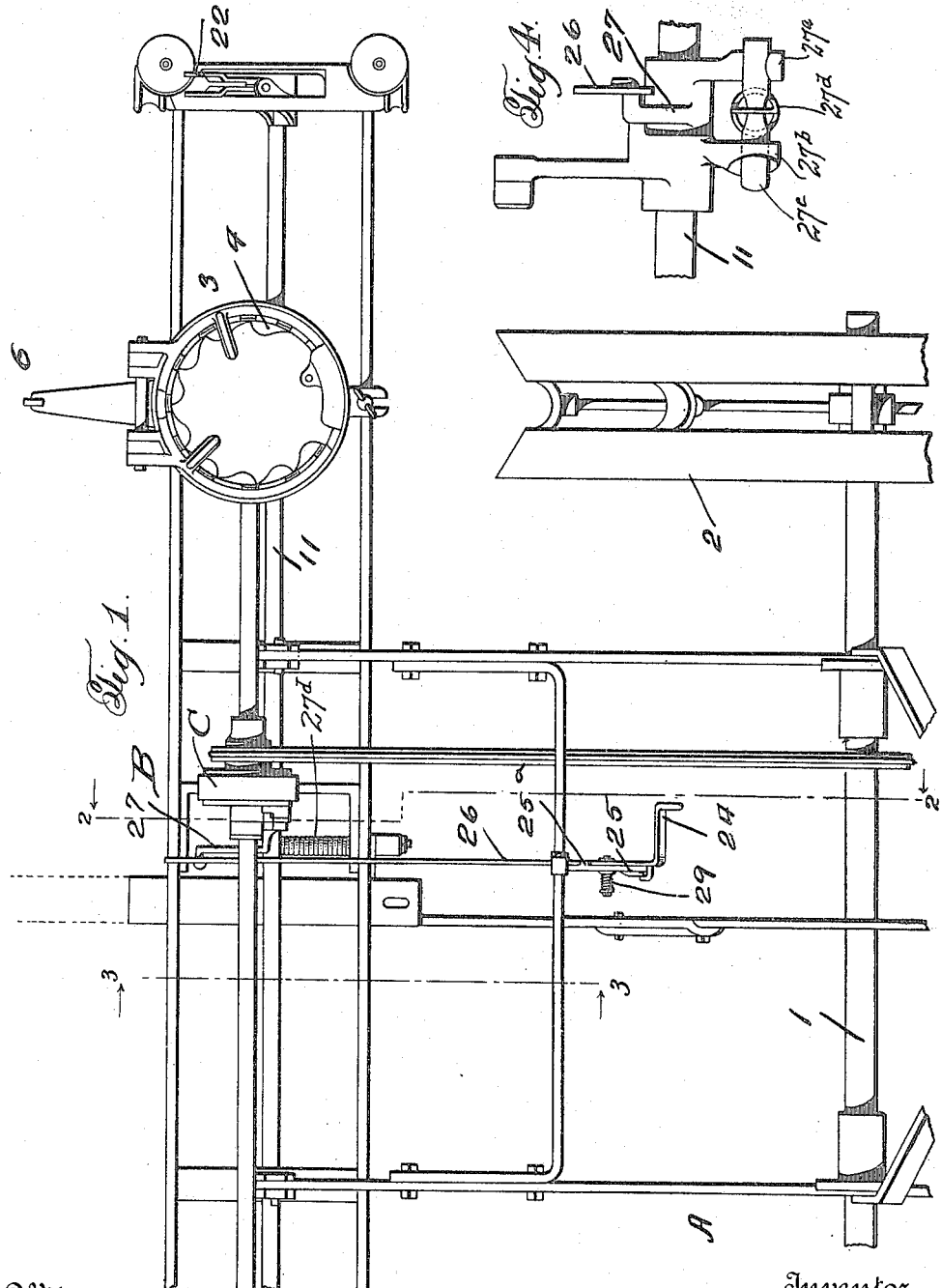
Witnesses:
Jas. S. Hutchinson
R. S. Gehr
Inventor.
Clarence H. Dooley
By H. H. Bliss Attorney

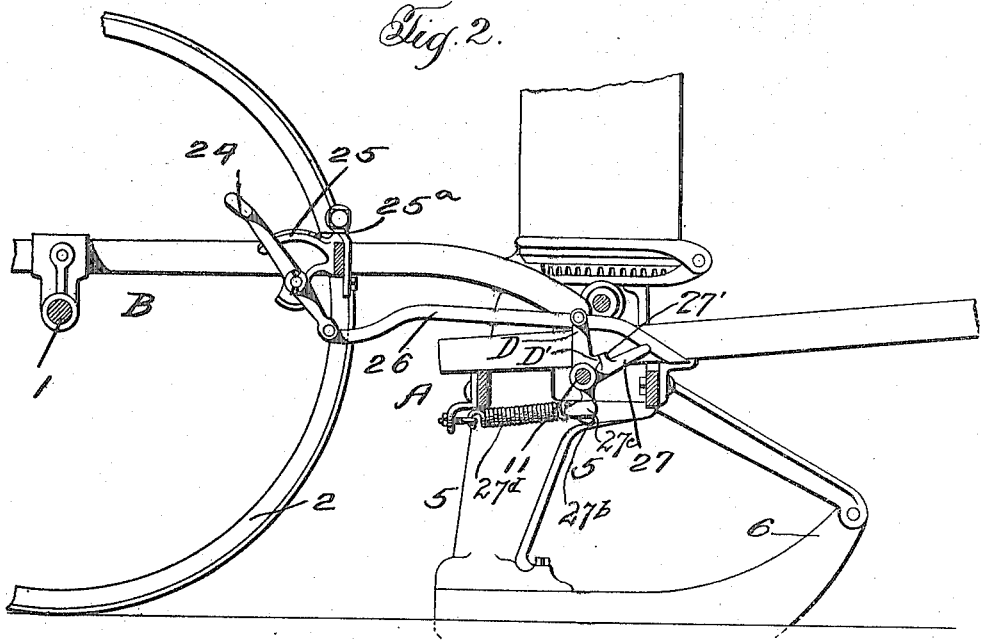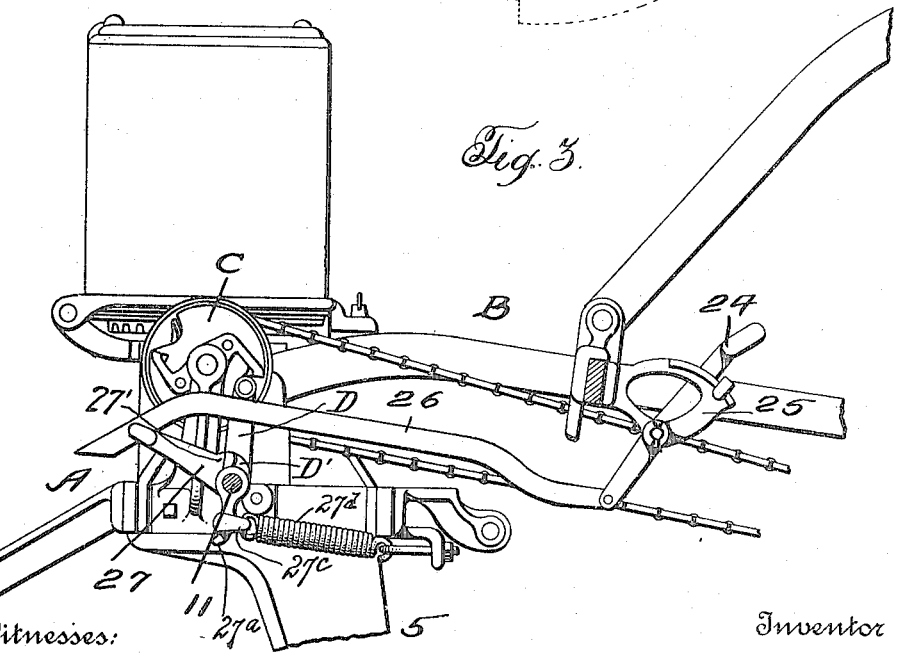

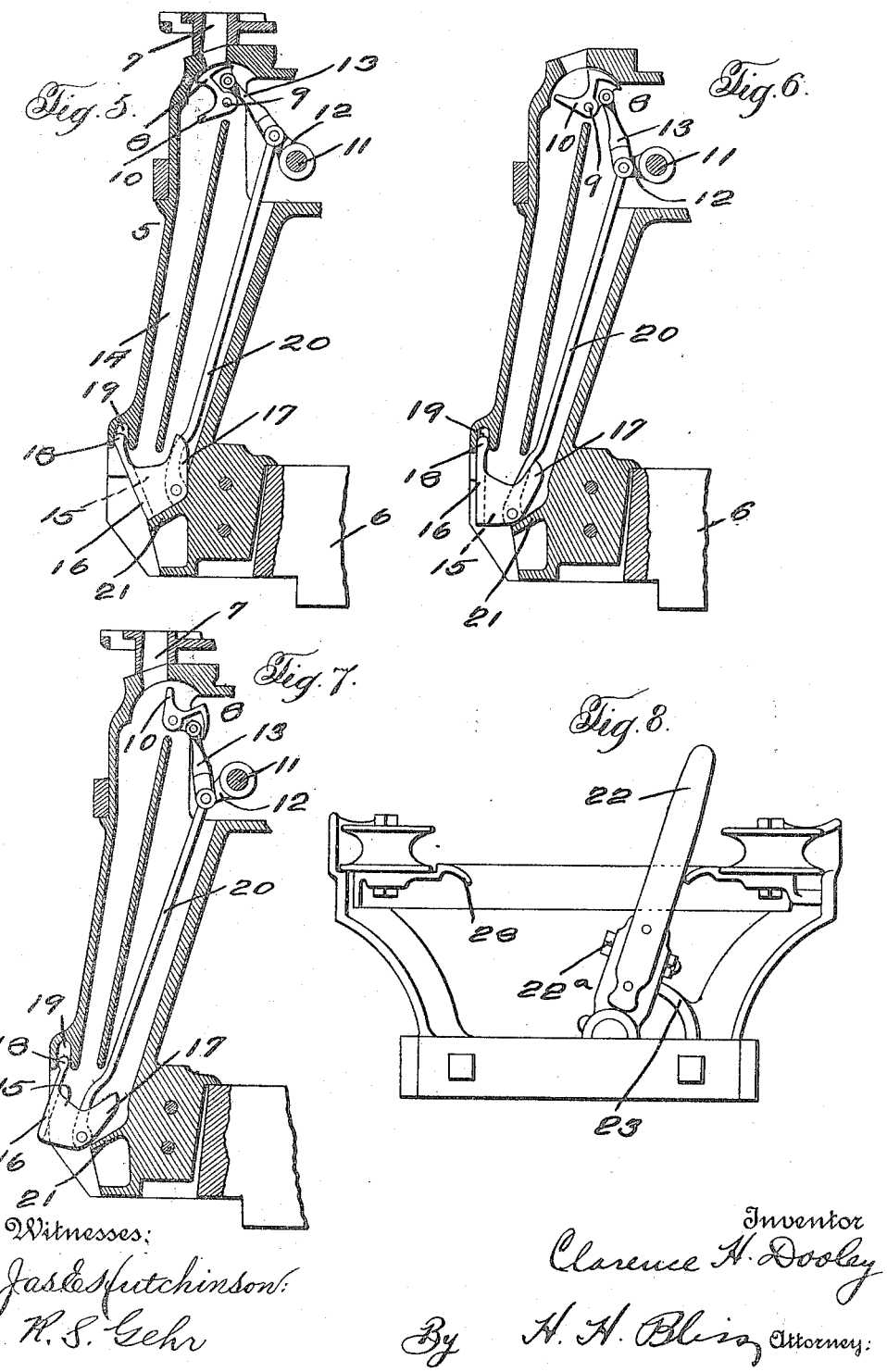

UNITED STATES PATENT OFFICE.

CLARENCE H. DOOLEY, OF ROCK ISLAND, ILLINOIS.

PLANTER.

1,202,684.  Specification of Letters Patent.  Patented Oct. 24, 1916.

Application filed March 24, 1910.  Serial No. 551,235.

*To all whom it may concern:*

Be it known that I, CLARENCE H. DOOLEY, a citizen of the United States, residing at Rock Island, in the county of Rock Island and State of Illinois, have invented certain new and useful Improvements in Planters, of which the following is a specification, reference being had therein to the accompanying drawing.

This invention relates to improvements in corn planting mechanisms of the class in which each has a seed-feeding mechanism which, at intervals, withdraws, one by one, a predetermined number of seeds to constitute separate hill charges and delivers them to conducting devices. Each entire apparatus of this class generally comprises the planting machine, proper, and a stationary tappet-wire laid across the field. The planting machine itself comprises a continuously-going, power-driving apparatus actuated from the ground wheels, a clutch interposed between the driver and the seeder and thrown intermittingly into action by a trip mechanism which is actuated by the tappet-wire. The seeds drop singly, and *seriatim*, from the feeding device into a receptacle where they are held until a predetermined number for a hill charge is accumulated; and from this they are delivered and finally deposited in the furrows opened by the runners.

The object of this invention is to provide a mechanism for insuring that the seeds shall not be scattered in their final delivery to the ground, and that the intervals of time during which they are moving, under the action of gravity downward, shall be such that all the seeds of each charge shall be simultaneously deposited in the soil at the bottom of the chute or tube.

Figure 1 is a plan view of a part of a planter sufficient to illustrate the manner of improvements. Fig. 2 is a vertical longitudinal section taken on the line 2—2 in Fig. 1. Fig. 3 is a vertical longitudinal section taken on the line 3—3 in Fig. 1. Fig. 4 is a detail view showing the clutch and associated parts in front elevation. Fig. 5 is a central longitudinal vertical section of a shank or boot, and showing the relative positions of the valves and valve mechanism, the valves being in the position occupied when the entrance to the boot is cut off. Fig. 6 is a similar sectional view of the valves and adjuncts in the positions occupied when the inlet to and outlet from the boot or shank are open. Fig. 7 is a similar vertical sectional view, showing the valves and their adjuncts in the position occupied when the parts are set for drilling. Fig. 8 is an end view of parts of the runner frame and showing the fork lever and some of the wire devices.

In the drawings I have shown somewhat conventionally more or less of the general parts of a planter, but it will be understood that as far as concerns the frames, the seeding mechanism and parts other than the boot and the valves the elements may be of any known or preferable character.

In the drawings, for the sake of illustration, there are shown at A the rear or wheel frame, at B the front or seeder frame, these being hinged together in the usual way.

At 1 the axle is illustrated, at 2 one of the supporting and seed covering wheels.

At 3 is indicated one of the seeder mechanisms, the can constituting the side walls and top of the hopper being removed to show the hopper bottom and a seed plate 4. This seed plate, as concerns its details, may be of any suitable construction if it be provided with seed cells, each adapted to take a single kernel from the indiscriminate mass in the can or hopper and then deliver it separately from the others. There are now several well-known mechanisms for imparting to such a seed-plate intermitting equal movements by which a series of these independently selected seeds can, at each actuation of the plate, and of a predetermined number, be taken out of the mass and delivered to an accumulating receptacle. These ends are generally attained by one or another of several species of mechanism, typified more or less conventionally, in the drawings, wherein there are indicated the usual sprocket-wheel-and-chain drive extending from the axle of the main ground wheels to one element of a clutch C on the seeder shaft (see Fig. 1), together with the other, normally stationary, clutch element (see Figs. 1 and 2).

The clutch elements are brought into operative connection by each tappet on the check wire, this being brought about by the backward swinging of the clutch trip arm D which is rigidly mounted on the transverse rocker shaft 11. This rocker shaft carries at its end check valve levers 22 adapted to be engaged by the tappets on the wires. When the shaft 11 is rocked and the arm D is swung backward power is imparted to the seed-feeder from the predetermined cycle of the driven part of the clutch, the latter being automatically disengaged by the lever D at the end of such cycle.

At the upper end of the seed duct there is a receptacle 7 immediately below the opening through which the seeds are discharged from the seed plate. Below the receptacle 7 there is an upper valve 8 pivotally mounted on a transverse pintle 9. The face of this valve is cylindrical and immediately below it there is a valve or plate at 10, and preferably this is formed integral with the valve part at 8. The upper portion serves as an accumulator valve, stopping the first kernels of the series delivered at an actuation of the feeder and holding them until the last kernel of the series has been dropped into the receptacle. And the valve at 10 serves as an intermediate arrester which receives simultaneously all the kernels of the charge when the accumulator valve is moved.

11 is the rocker shaft to which are attached the check fork levers 22. The shaft carries a crank arm 12 which is connected by a link 13 to the valve 8.

14 is the duct through which the seeds pass as they drop from the parts above mentioned to the lower valve or cut off. The latter consists of a tubular element or valve chamber 15 comprising a rear wall 16 and side walls or wings 17 which extend forward and have an easy sliding fit between the lateral walls of the shank or boot. The rear wall 16 has an upward extending pivot part at 18 which fits in a socket 19 in the rear wall of the shank.

20 is a link connecting the end of the crank arm 12 on the rock shaft with the forward part of the side walls 17 of the lower valve chamber 15. The lower part of link 20 is formed as shown and, extending between the side flanges or wings 17, serves as the front wall of the chamber in the valve, the other walls being formed by the side flanges or wings 17 and the rear wall 16.

When the extreme valves are closed, as shown in Fig. 5, the bottom parts of the valve chamber 15 rest upon a shelf 21 which extends downward and backward and is formed integrally with the lower part of the foot and shank, and if the extreme valves are opened the bottom parts of the lower valve chamber slide upon the shelf which thus supports the valve so that it swings on the pivot of extension 18.

The seed duct or chute 14, in contrast with those in some earlier machines, is formed with side walls which are stationary throughout, and the kernels, after leaving the hill-arresting valve at 10, drop directly to the lower valve without disadvantageous contact with any of the walls of the duct. The duct slopes backward and downward somewhat to compensate for the forward travel of the duct with the machine, the aim being to permit the kernels to reach the lower valve without contacting with any metallic parts.

Upon the first actuation of the check fork 22 by a tappet on a check wire, the rock shaft 11 is moved a distance which is limited by the check fork striking the stop at 23. This movement of the rock shaft is sufficient to swing the upper valve to its open position, and at the same time push the lower valve chamber off from the shelf 21 to the open position shown in Fig. 6. Thus seeds which have been, up to this instant, resting upon the shelf 21 and retained by the valve chamber, are now instantaneously dropped into the furrow. At the same time the new charge or hill of seeds which has accumulated on the valve 8 will, as this valve opens, be allowed to pass it; and as the intermediate valve or plate at 10 is thrown to a position across the duct at the instant the upper valve is opened, a charge of seeds will be caught upon the intermediate valve and be retained by it so long as the lower valve at 15 is in open position as in Fig. 6.

When the check fork is returned to its initial position on its release from the wire tappet, the extreme valves at 8 and 15 are moved to their closed position, as shown in Fig. 5, and at the same time the intermediate valve 9 is rocked downward and discharges the hill or charge of seeds which it had intercepted and the seeds are caught in the lower valve chamber at 15, and as the latter is closed by the shelf 21 they are retained there until the extreme valve is again opened.

The movable parts of the valve system at 8, 10, 15, 16, 17, etc., are, as will be seen, made of small, light parts. The movable upper parts 8 and 10, are so arranged that both are close to the shallow initial receptacle immediately below the feeder. The weight is reduced to the minimum and the different parts are approximately balanced on their pivot. The lower valve part (15, 16, 17, 18, etc.) has its weight also reduced to a minimum, it consisting of practically nothing but a small, light box with a short pivot arm loosely supported at 19 with a reduction of friction and cramping. The intermediate valve or hill-arrester at 10 is placed a distance from the lower valve as great as possible to insure that the kernels shall not reach the lower valve before it is closed.

The valve devices must be started from rest and moved through both of their throws and back to their normal position of rest in an exceedingly brief interval, this being exactly the same interval of time occupied by the trip fork in one of its reciprocations. The trip devices during such reciprocation also effect (in the well-known way) the connecting of the ground wheel drive, through the clutch, with the seed-feeder (parts shown in Figs. 1, 2 and 3) and immediately upon the close of the movement of the trip fork and the valves the feeder plate commences to drop the kernels of the next series, one after the other, upon the accumulator valve at 8.

The intermediate valve, it will be seen, contains within itself the pocket or cavity which holds the charge of kernels after they leave the accumulator valve. The kernels are not pressed or held against any of the duct walls, the walls which hold them in the arrester valve being entirely within that device so that they are held independently of the other parts of the machine. Their delivery and escape depend entirely upon the rotation of this valve and not upon merely opening a passage space between it and any neighboring stationary wall. Their delivery is therefore positive, and whether the kernels be large or small they escape at the same instant from this arrester.

Means are provided whereby the valves can be controlled and actuated by the driver when he desires, as for example at the end of the rows, where it may be desirable to plant the last two or three hills independently of a check wire. This means comprises a foot lever 24 which is mounted on a bracket 25 carried by the main frame of the machine. This lever is connected by a link 26 to a rocker arm 27 on the shaft 11. The arm 27 is loosely mounted on the rock shaft 11 and is provided with a lug 27' adapted to engage a lug D' on the clutch trip lever D. It will be seen that by this construction the lever D, together with the rock shaft, is free to swing backward independently of the arm 27, but that the arm 27, when swung backward, will carry with it the lever D and the rock shaft. The driver can put his foot upon lever 24 and press it forward so as to move the arm 27, the lever D and the rock shaft 11 to open and to close the valves in the same manner as they are actuated by the wire tappets. When the shaft 11 and the lever D are actuated by the tappet wire the arm 27 and the foot lever mechanism remain idle.

Extending downward from the arm 27 and from the clutch trip arm are companion fingers 27ª and 27ᵇ. Extending between these fingers and loosely engaging them is a cross bar 27ᶜ, which is engaged by a tension spring 27ᵈ. It will be seen that by means of this construction the spring tends to hold the arm 27 and the clutch trip arm in their forward positions and yet permits the clutch trip arm to be moved independently of the arm 27.

It is frequently desirable to change from check rowing to drilling, as for instance, when it comes to planting at the spaces at the ends of the field where the machine has been turned time and again during the check row planting. In my improved machine the driver is enabled to make this change without leaving his seat, and in the following manner: The rock shaft in this machine normally can oscillate between two limits determined by the stops 23 and 28 against which the check fork 22 impinges. The check fork, however, is jointed at 22ª as is customary, and when the upper part of the fork is swung downward and outward, as it is when the wire is doffed, the rock shaft is free to turn backward through a greater range. When it is desired to change from hill dropping to drilling, the check wire is first doffed, and then the driver places his foot on the lever 24 and forces it forward past the locking tooth 25ª on the bracket 25, thus causing the rock shaft 11 to swing through more than its normal range and causing the upper valve 8 and the lower valve 15 to move into the extreme open positions shown in Fig. 7. The parts are retained in these positions by the locking tooth 25ª, the foot lever 24 being permitted to swing laterally to pass the locking tooth by a spring 29 which presses the foot lever yieldingly against the bracket 25. When it is desired to use the check rower again, it is only necessary for the driver to release the locking lever, when the rock shaft and with it the dropping valves return to the positions shown in Fig. 5, after which the wire tappets actuate the valves in the manner previously described.

Heretofore in mechanism adapted for changing from hill planting to drilling, it has been necessary for the driver to stop the machine and fasten the extreme valves open, and, if an intermediate check valve is employed, to put it out of action by some manual operation which it is necessary to perform at each side of the machine. In a device such as is herein shown the driver has complete control of all parts and is able to change from one to the other of the adjustments to permit check rowing on the one hand and drilling on the other.

I am aware that a series of three or more valve-like parts have been used or proposed for use in corn planters of the "full-hill-drop" class, that is, machines of the sort in which each has a feeder that is intended to take from an indiscriminate mass of seeds all of the kernels for a hill at each actuation, whether three, four, or more. But I do not know of any earlier mechanism of this class having the valves or drop-controllers for the seed constructed and arranged in the way which I have devised. In the "full-hill-drop" machines the movements of the seed-plate and of the valves have all been simultaneous and have commenced and ended with the same intervals of time. The tappet mechanism supplied the power for the movement of the valves. In the present construction these movements are entirely independent of each other; the valves are actuated directly by the trip device, but the plate is driven from the ground wheels as a power motor, the trip merely causing the driving connection to be effected. The movement of the trip, and the commensurate movement of the valves, take place in a mere instant, a minute fraction of a second, but the time occupied by the movement of the plate is much longer in order to assuredly deliver all of the kernels of each series, which are taken from the indiscriminate mass, one by one, up to the predetermined number. Hence, the receptacle below the counting feeder must be held closed during the entire time that the plate is moving in order to arrest the fifth, fourth, or even third, kernel of the charge, as well as the first, and it can only be opened for an instant prior to the movement of the plate, this opening being accomplished by the trip acting directly on the valves. Consequently, the latter, in the present construction have a materially different relationship to the receptacle and to the feeding mechanism, when compared with that established between the valves the feeder and the other parts, in a "full-hill-drop" machine. I am also aware that even in the sub-class of the present machine, to wit, charge-counting planters (which drop a number of seeds *seriatim* at each actuation) it has been proposed to overcome the difficulties which I have met with and am now referring to. But I have no knowledge of any of these machines having been successful; and the present devices are a marked improvement thereon.

In earlier constructions, the intermediate arrester which holds the charge has been placed at a remote point from the initial receptacle which forms the hill-charge, the distance between them being from one-third to four-fifths of the total length of the seed duct. Consequently, there has not been sufficient time for the drop from the arrester to the lower valve; the latter is, relatively, open too long for the drop, many hills are straggled along the ground, and during a large percentage of the actuations of the lower valve the kernels are caught by it and are broken and crushed. The drop from the seed-plate to the lower valve occurs during an interval as short as, or shorter than, that of the opening and closing of the valves, or, which is equivalent, the movements of the trip fork.

I place the intermediate hill-arrester immediately below the initial receptacle, giving the kernels as long a path as possible to the lower valve to permit the latter to be opened and closed before those dropping from the arrester can reach it.

The keeping of load off from the trip has been one of the principal aims in the use of the ground-wheel-and-clutch drive, as in the older machines the impeding of the movements of the valve devices caused by loading their trip with the inertia of the feeder, was discovered to be the principal cause of inaccuracy in planting.

In the present mechanism the load on the trip devices (comprising the tappet fork, the rock shaft and the valves) is kept at the minimum, the valve parts not being elongated tubes or cumbersome heavy parts, but small articles which can be instantaneously started, moved, and brought back, by the trip in the fraction of a second. But, on the other hand, the plate, actuated by the ground-wheels and the clutch (merely started by the trip) continues in movement for a long time, for the purpose above described.

If the accumulator valve at the upper end of the duct were open during any part of the movement of the plate there would be danger of the kernels straggling, and that the predetermined number would not be assured.

What I claim is:—

1. In a planter the combination of a seed separating plate adapted to deliver seeds successively, one by one, a seed duct arranged to receive seeds from the plate and conduct them to the soil, a valve located near the upper end of the duct, a valve located near the lower end of the duct, an intermediate valve mounted for movement about a pivotal axis at one side of the passageway through the duct, valve controlling mechanism connected with all the valves to hold the upper and lower valves open when the intermediate valve is closed, and means for moving the controlling mechanism in one direction to close the upper and lower valves and move the intermediate valve downward into an open position or in the other direction to move the intermediate valve upward into an open position without closing the upper and lower valves.

2. In a seed dropping mechanism for planters, the combination with a structure forming a seed duct, a seed receiving and valve supporting ledge or wall at the lower end of the duct and a socket or recess at the lower end of the duct, of a seed discharging valve resting slidably upon the seed supporting ledge and having a pivot extension loosely engaged in the said socket, and means for swinging the valve through a limited arc.

3. In a planter seed dropping mechanism, the combination with a seed tube and a seed controlling mechanism at the top thereof, of a lower valve comprising a valve seat at the bottom of the tube, a tubular valve body adapted to engage the valve seat, a sliding pivotal connection between the valve body and a part of the tube, and means independent of the said pivotal connection for moving the valve body relative to the seat about the said sliding pivotal connection.

In testimony whereof I affix my signature, in presence of two witnesses.

CLARENCE H. DOOLEY.

Witnesses:
GALE PORTER,
RALPH B. LAURIE.

Copies of this patent may be obtained for five cents each, by addressing the "Commissioner of Patents, Washington, D. C."